United States Patent Office 3,206,184
Patented Sept. 14, 1965

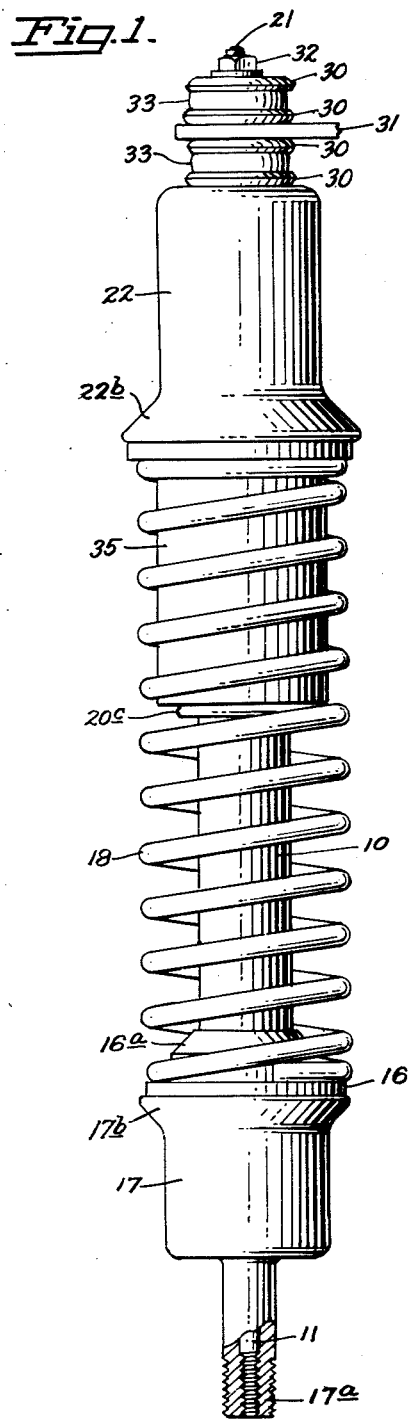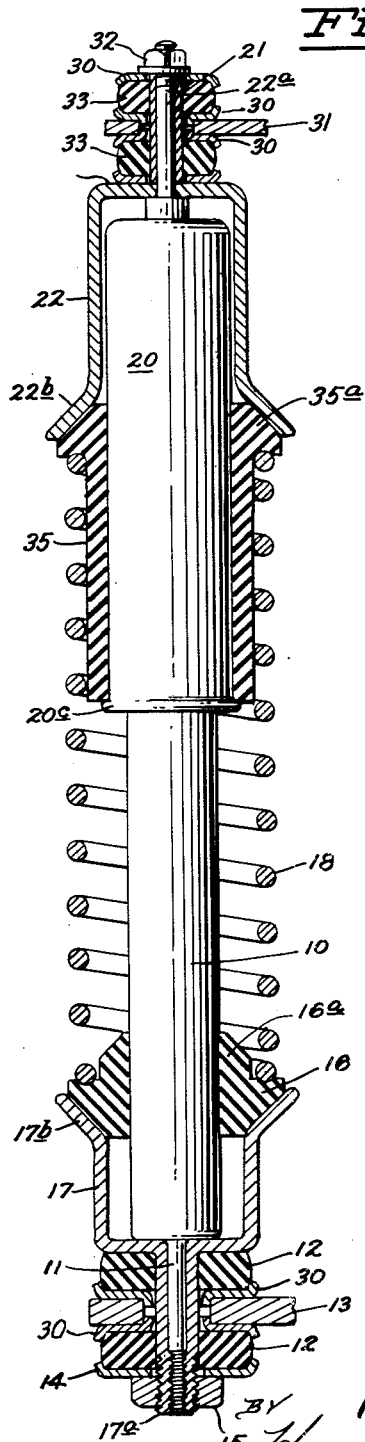

3,206,184
ADAPTERS FOR MOUNTING A SPRING
ON A SHOCK ABSORBER
Brooks Walker, 1280 Columbus Ave.,
San Francisco, Calif.
Continuation of application Ser. No. 147,889, Oct. 26, 1961. This application May 31, 1963, Ser. No. 284,581
4 Claims. (Cl. 267—8)

This invention pertains to improvements to adapters for mounting a spring on shock absorbers. This application is a continuation of my copending application Serial No. 147,889, filed October 26, 1961, now abandoned. Other adapters for mounting springs on shock absorbers have been shown in applicant's U.S. Patent No. 2,889,144, entitled "Spring Adapters For Shock Absorbers," U.S. Patent No. 2,912,235, entitled "Automatic Vehicle Support For A Vehicle," and U.S. Patent No. 2,896,938 entitled "Vehicle Suspension Device." The dimensions of the exterior of the rock guard and the exterior of the main body of the various shock absorbers vary materially and it is the purpose of this invention to make adapters that lend themselves to varying dimensions of the shock absorbers, provide nonmetallic rubber-like adapters to cooperate with the metal adapters, provide the adapters with tubular extensions that are adapted to pass through the rubber mountings and be secured possibly in position between the threads on the ends of the pins mounted on the shock absorbers and the end of the shock absorbers at which end of the shock absorber is attached.

Another feature of the invention is to provide a cone seat on the adapter into which a rubber or non-metallic bushing fits that is held in place by the pressure of the spring and the rubber or non-metallic adapter has an extension that passes over the rock guard or body of the shock absorber to act as a guide for the inside of the coils of the spring.

Other advantages and features of the invention will be apparent to those skilled in the art, particularly with reference to the following specification and claims.

I have illustrated my invention by way of example in the accompanying figures, in which:

FIG. 1 is a side view partly cut away of one form of the invention.

FIG. 2 is similar to FIG. 1 with more of the parts shown in section.

In FIGS. 1 and 2 I have shown a tubular, direct acting, telescoping shock absorber with a main body 10, a rock guard 20, a pin end 11 secured to the body 10 and a pin or piston rod end 21 connected with the rock guard 20 and movable axially and telescopically relative to the body 10. At the upper end of the shock absorber is an adapter 22 and a tubular element 22a which passes through washers 30, rubbers 33 and the portion of the vehicle frame 31 to which the upper end of the shock absorber is attached. Nut 32 bears against the upper end of the tubular extension of 22a to hold extension 22a and its connected adapter 22 seemingly in position against an abutment at the upper end of the rock guard. Rubber or non-metallic adapter 35 fits closely over the rock guard body down to flange 20c at the lower end of the rock guard. The outer diameter of the portion of adapter 35 that lies inside of the coils of the spring 18 is larger than the outer diameter of flange 20c so that the springs cannot catch on the metal flange. The upper end 35a of rubber or non-metallic adapter 35 is formed to fit inside of the coned lower end 22b of metal adapter 22. The pressure of spring 18 acting on the shoulder of end 35a of adapter 35 forces the cone of 35a into the cone of adapter 22b to tend to center 22b about rock guard 20 and to prevent any rattling between adapter 22 and rock guard 20. Adapter 17 at the lower end of the shock absorber has an extension 17a which is threaded internally at its lower end to fit the threads on pin end 11 attached to the body 10 of the lower portion of the shock absorber as viewed in FIGS. 1 and 2. Between the internally threaded portions of the tubular end 17a and the main shock body 10, the tubular portion is counterbored so as to pass over the unthreaded portion of shock end 11. Lower adapter 17 carries flange 17b into which cone-faced rubber or non-metallic 16 seats to center adapter 17 and also center the lower end of spring 18 by shoulder 16a. When tubular extension 17a is screwed down tightly on rod 11, adapter 17 is held positively in place and alignment with shock absorber body 10. Rubbers 12, washers 30 and 14 are secured over tubular extension 17a by nut 15 and attach the low end of the shock absorber to the axle mounting 13 in a manner that will provide the necessary or usual angular flexibility required in shock absorber mountings.

By this construction I have provided adapters that fit on rod end shock absorbers in a positive and firm manner so that they will not move back and forth on the pin ends with the push and pull resistance of the shock absorber axle to frame motion. The rubber adapters serve to cushion and insulate the vibrations set up in the spring from the shock absorber and its mountings and to center the adapters even though they are made large enough to fit the larger of various size shock absorbers.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A suspension device connectable between sprung and unsprung elements, including a tubular direct-acting hydraulic shock absorber having relatively movable telescopic portions, a coil spring around said shock absorber, means supporting one end of said spring on one of said telescopic shock absorber portions, a rigid adapter connected with the other of said telescopic shock absorber portions and including an element having a tubular portion and a generally frusto conical abutment end facing toward said spring, a non-metallic insulator having a frusto conical portion abutting said frusto conical abutment end and having a shoulder engaging the other end of said spring so that said spring is supported between the telescopic portions of said shock absorber, said insulator having a tubular portion extending from said shoulder into said other end of said coil spring.

2. A suspension device connectable between sprung and unsprung elements, including a tubular direct-acting hydraulic shock absorber having relatively movable telescopic portions, a coil spring around said shock absorber, means supporting the opposite ends of said spring on said telescopic shock absorber portions, said last means including a rigid adapter connected with one of said shock absorber portions, said adapter having a cylindrical portion and a generally frusto conical abutment end portion facing the supporting means for the opposite end of said spring, a non-metallic insulator within said coil spring and movable with said spring and one shock absorber portion and having a shoulder intermediate its ends, engaging one end of said coil spring, said insulator including a frusto conical abutment portion disposed on the opposite side of said shoulder from said tubular portion and engaging said adapter abutment end portion.

3. A suspension device connectable between sprung and unsprung elements, including a tubular direct-acting shock absorber having a tubular body member and a piston rod projecting from one of said body member and movable axially therein, a coil spring around said shock absorber, means supporting one end of said spring on said shock absorber body member, a rigid adapter member of cylindrical form connected with said piston rod adjacent the projecting end thereof and including a generally frusto conical abutment portion on the end of the cylinder facing toward said spring a hollow cylindrical non-metallic insulator element within the spring having a frusto conical abutment portion engaging the abutment portion of said adapter and having a generally flat portion, engaging the opposite end of said spring so that said spring is supported between the relatively movable parts of said shock absorber.

4. A suspension device connectable between sprung and unsprung elements, including a tubular direct-acting shock absorber having a tubular body member and a tubular rock guard concentric with one end of and telescopically movable relative to said body member, means on the opposite end of said body member for connecting the same to one of said elements, means connected with said rock guard for connecting the same with said other element, a coil spring surrounding said shock absorber in a concentric relationship, a non-metallic sleeve supported on and concentric with said rock guard over a portion of its length, a non-metallic abutment on said sleeve engaging one end of said spring, a tubular adapter member sleeved over and radially spaced from said rock guard and disposed between said rock guard connecting means and said abutment, said abutment and said adapter having complementary engaging surfaces retaining said adapter in a substantially concentric relationship to said rock guard, and a non-metallic abutment engaging the opposite end of said spring and supported by said body member connecting means whereby said spring is supported on said shock absorber in a concentric relation therewith and between the telescopically movable parts of said shock absorber.

References Cited by the Examiner

UNITED STATES PATENTS

| 199,945 | 2/78 | Vose | 267—33 |
|---|---|---|---|
| 2,023,756 | 12/35 | Brownyer. | |
| 2,889,144 | 6/59 | Walker | 267—8 |
| 2,896,938 | 7/59 | Walker | 267—8 |
| 2,902,274 | 9/59 | McIntyre | 267—8 |

FOREIGN PATENTS 811,556  4/59  Great Britain.

OTHER REFERENCES

Hemscheidt, German application 1,060,723, printed Sept. 2, 1959 (Kl 63C 42).

ARTHUR L. LA POINT, *Primary Examiner.*